US010633479B2

(12) United States Patent
Sakamoto (10) Patent No.: US 10,633,479 B2
(45) Date of Patent: Apr. 28, 2020

(54) POLYMER COMPOSITION COMPRISING THERMOPLASTIC POLYURETHANE AND POLYOLEFIN (71) Applicant: BASF SE, Ludwigshafen (DE)

(72) Inventor: Koji Sakamoto, Ritto (JP)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/565,434

(22) PCT Filed: Apr. 25, 2016

(86) PCT No.: PCT/EP2016/059122
§ 371 (c)(1),
(2) Date: Oct. 10, 2017

(87) PCT Pub. No.: WO2016/173961
PCT Pub. Date: Nov. 3, 2016

(65) Prior Publication Data
US 2018/0118870 A1 May 3, 2018

(30) Foreign Application Priority Data

Apr. 30, 2015 (EP) .................................... 15166017

(51) Int. Cl.
C08G 18/08 (2006.01)
C08G 18/66 (2006.01)
(Continued)

(52) U.S. Cl.
CPC ..... C08G 18/0895 (2013.01); C08G 18/6674 (2013.01); C08G 18/7671 (2013.01);
(Continued)

(58) Field of Classification Search
CPC ........ C08L 75/04; C08L 53/025; C08L 23/04; C08L 23/12; C08L 23/02
See application file for complete search history.

(56) References Cited

U.S. PATENT DOCUMENTS

H724 H * 1/1990 Gergen .......................... 525/314
5,623,019 A * 4/1997 Wiggins .................. C08L 23/02
525/130

(Continued)

FOREIGN PATENT DOCUMENTS

EP 0 959 104 B1 2/2005
WO WO 2009/071549 A1 6/2009

OTHER PUBLICATIONS

International Search Report and Written Opinion dated Jul. 5, 2016 in PCT/EP2016/059122.

(Continued)

Primary Examiner — Mark S Kaucher
(74) Attorney, Agent, or Firm — Oblon, McClelland, Maier & Neustadt, L.L.P.

(57) ABSTRACT

The invention is directed to a polymer composition comprising 60 to 85 parts by weight of a thermoplastic polyurethane; and 15 to 40 parts by weight of a polyolefin, where the parts by weight of the thermoplastic polyurethane and parts by weight of the polyolefin add up to 100 parts by weight; and further comprising 1 to 15 parts by weight of a hydrogenated block copolymer derived from a vinyl aromatic monomer and a conjugated diene monomer, based on 100 parts by weight as a total amount of the thermoplastic polyurethane and polyolefin. The invention is further directed to a molded article based on the polymer composition.

19 Claims, 1 Drawing Sheet (51) Int. Cl.
  *C08G 18/76*  (2006.01)
  *C08L 75/04*  (2006.01)
  *C08L 23/06*  (2006.01)
  *C08L 25/10*  (2006.01)

(52) U.S. Cl.
  CPC ............... *C08L 23/06* (2013.01); *C08L 25/10* (2013.01); *C08L 75/04* (2013.01); *C08G 2120/00* (2013.01); *C08G 2410/00* (2013.01); *C08L 2205/03* (2013.01)

(56) References Cited

U.S. PATENT DOCUMENTS

| | | | |
|---|---|---|---|
| 6,072,003 A | | 6/2000 | Horrion et al. |
| 6,106,952 A | * | 8/2000 | Yamashita ............... C08L 53/02 264/241 |
| 6,140,425 A | * | 10/2000 | DeNicola, Jr. ......... C08F 255/02 525/293 |

OTHER PUBLICATIONS

Extended European Search Report dated Nov. 20, 2015 in Patent Application No. 15166017.2.

* cited by examiner

POLYMER COMPOSITION COMPRISING THERMOPLASTIC POLYURETHANE AND POLYOLEFIN

BACKGROUND OF THE INVENTION

The present invention relates to a polymer composition comprising 60 to 85 parts by weight of a thermoplastic polyurethane A), 15 to 40 parts by weight of a polyolefin B), where the total amount of the thermoplastic polyurethane A) and polyolefin B) is 100 parts by weight. The polymer composition further comprises 1 to 15 parts by weight of a hydrogenated block copolymer C), derived from a vinyl aromatic monomer and a conjugated diene monomer, based on 100 parts by weight of the thermoplastic polyurethane A) and polyolefin B).

RELATED ART

Thermoplastic materials have a wide variety of applications. By way of example, the thermoplastic material are found in the clothing and footwear such as a shoe sole and a belt, in electronic goods such as cable sheathing and in commodities such as hoses etc.

As such materials, thermoplastic polyurethanes and polyamide-based elastomers are preferably used. Thermoplastic polyurethane has a good abrasion resistance, however the weight is relatively high. On the contrary, though polyamide-based elastomers has a lighter weight, it has a worse abrasion resistance.

To enhance properties of the thermoplastic material, varietal trials have been done. For example, EP0959104B1 describes a blend comprising (I) thermoplastic polyurethane having a Shore hardness in the range of 60A to 50D and (II) an unmodified ethylene-propylene rubber.

Problem to be Solved

However, such material has poor durability, especially in severe environments.

The present invention has been created for solving the above inconveniences and its object is to provide a polymer composition that has improved durability in varietal environment. By using the inventive composition, it becomes possible to produce varietal articles with good durability, especially suitable for uses in varietal environment such as a cold region.

SUMMARY OF INVENTION

Those objects are achieved, in accordance with the present invention, by a polymer composition comprising 60 to 85 parts by weight of thermoplastic polyurethane A), and 15 to 40 parts by weight of polyolefin B) where parts by weight of the thermoplastic polyurethane A) and parts by weight of polyolefin B) add up to 100 parts by weight, and further comprising 1 to 15 parts by weight of a compatibilizing agent C), based on 100 parts by weight as a total amount of the thermoplastic polyurethane A) and polyolefin B). The compatibilizing agent C), also referred as a compatibilizer, is a hydrogenated block copolymer derived from a vinyl aromatic monomer and a conjugated diene monomer. Details will be explained hereinafter.

DESCRIPTION OF EMBODIMENTS

The inventive polymer composition comprises 60 to 85 parts by weight of thermoplastic polyurethane A), and 15 to 40 parts by weight of polyolefin B), where the total amount of the thermoplastic polyurethane A) and polyolefin B) is 100 parts by weight, and further comprises 1 to 15 parts by weight of compatibilizer C) such as a hydrogenated block copolymer, based on 100 parts by weight of the thermoplastic polyurethane A) and polyolefin B) in total. Such weight ratio of A), B) and C) successfully make a sea-island structure in the composition, a semi-processed product thereof, and/or a final product such as a molded article even when a processing condition such as temperature is changed.

Thermoplastic Polyurethane A)

The thermoplastic polyurethane (also referred as to TPU) is not particularly limited to a specific polyurethane. For example, TPU can preferably be obtained via a reaction of an isocyanate (a1) with a compound (a2) which is reactive toward the isocyanate, and optionally a chain extender (a3), optionally in the presence of a catalyst (a4), and/or of a conventional auxiliary agent (a5).

The components usually used in producing the preferred thermoplastic polyurethane (TPU) will be described by way of example below, these being the isocyanate (a1), compound reactive toward the isocyanate (a2), chain extender (a3), and also optionally catalyst (a4), and/or conventional auxiliary agent (a5):

The organic isocyanate (a1) to be used is preferably aliphatic, cycloaliphatic, araliphatic, and/or aromatic isocyanates, more preferably tri-, tetra-, penta-, hexa-, hepta-, and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and/or dicyclohexylmethane 4,4'-, 2,4'-, and 2,2'-diisocyanate, diphenylmethane 2,2'-, 2,4'-, and/or 4,4'-diisocyanate (MDI), 1,5-naphthylene diisocyanate (NDI), tolylene 2,4- and/or 2,6-diisocyanate (TDI), diphenylmethane diisocyanate, 3,3'-dimethyldiphenyl diisocyanate, 1,2-diphenylethane diisocyanate and/or phenylene diisocyanate 1,6-Diisocyanate hexamethylene (HDI), 4,4'-Methylene dicyclohexyl diisocyanate (H12MDI). Particular preference is given 4,4'-MDI.

The compound (a2), reactive toward the isocyanate, to be used is preferably polyesterol, polyetherol, and/or polycarbonatediol, for which the collective term "polyol" is also usually used. Among of those polyols (a2), polyetherol (polyether polyol) is preferable, considering viscoelasticity in molding or extruding process. Especially, polytetrahydrofurane (polytetramethylene ether glycol) is preferable as polyetherol. The number-average molar masses of these polyols are, for example, from 0.5 kg/mol to 8 kg/mol, preferably from 0.6 kg/mol to 5 kg/mol, in particular from 0.8 kg/mol to 3 kg/mol, and they preferably have an average functionality of from 1.8 to 2.3, preferably from 1.9 to 2.2, in particular 2. The compound (a2) preferably has only primary hydroxy group(s). In the description, "molar mass" is a value obtained by gel permeation chromatography (GPC).

The chain extender (a3) which may preferably be used is aliphatic, araliphatic, aromatic and/or cycloaliphatic compound with a molar mass of, for example, 0.05 kg/mol to 0.499 kg/mol, preferably bifunctional compound, for example diamines and/or alkanediols having from 2 to 10 carbon atoms in the alkylene radical, in particular ethanediol, 1,3-propanediol, 1,4-butanediol, 1,6-hexanediol, and/or di-, tri-, tetra-, penta-, hexa-, hepta-, octa-, nona-, and/or decaalkylene glycols having from 2 to 8 carbon atoms, and preferably corresponding oligo- and/or polypropylene glycols. Mixtures of the chain extenders may also be used here. The compound (a3) preferably has only primary hydroxy group(s) and the most preferably 1,4 butanediol. In one preferred embodiment, the catalyst (a4) which in particular accelerates the reaction between the NCO group of the diisocyanate (a1) and the hydroxy group of the compound (a2) reactive toward isocyanates and of the chain extender (a3) is tertiary amine, in particular triethylamine, dimethylcyclohexylamine, N-methylmorpholine, N,N'-dimethylpiperazine, 2-(dimethylaminoethoxy)ethanol, diazabicyclo [2.2.2]octane, and the like, and in another preferred embodiment, organometallic compound, such as titanic ester, iron compound, preferably ferric acetylacetonate, tin compound, preferably stannous diacetate, stannous dioctoate, stannous dilaurate, or the dialkyltin salts of aliphatic carboxylic acid, e.g. dibutyltin diacetate, dibutyltin dilaurate. The amount of the catalyst (a4) is preferably from 0.0001 to 0.1 part by weight per 100 parts by weight of the compound (a2) reactive with isocyanates. It is preferable to use a tin catalyst, in particular stannous dioctoate.

In addition to catalysts (a4), other materials which may be added to the structural components (a1) to (a3) are conventional auxiliary agents (a5). By way of example, mention may be made of a surface-active substance, a filler, a flame retardant, a nucleating agent, an antioxidant, a lubricant, a mold-release agent, a dye, a pigment, a stabilizer e.g. with respect to hydrolysis, light, heat, or discoloration, an inorganic and/or organic filler, a reinforcing agent, and a plasticizer. A hydrolysis stabilizer such as an oligomeric and/or polymeric aliphatic or aromatic carbodiimide may be used. Stabilizers may preferably be added to the TPU to stabilize them with respect to aging. Stabilizers are additives which protect a plastic or a plastic mixture from adverse effects of the environment. Examples are primary and secondary antioxidants, hindered amine light stabilizers, UV absorbers, hydrolysis stabilizers, quenchers, and flame retardants. Examples of commercially available stabilizers are given in Plastics Additive Handbook, 5th Edition, H. Zweifel, ed., Hanser Publishers, Munich, 2001 ([1]), pp. 98-136. More details about the above-mentioned auxiliary agents and additives can be found in the technical literature, e.g. in Plastics Additive Handbook, 5th edition, H. Zweifel, ed, Hanser Publishers, Munich, 2001.

The molar ratios of structural components (a2) and (a3) can be varied relatively widely in order to adjust the hardness of the TPU. Successful molar ratios of component (a2) to the entire amount of chain extenders (a3) to be used have proven to be from 10:1 to 1:10, in particular from 1:1 to 1:4, where the hardness of the TPU rises as content of (a3) increases. The reaction can take place with usual indices, preferably with an index of from 60 to 130, particularly preferably with an index of from 80 to 110. The index is defined via the ratio of the total number of isocyanate groups used during the reaction in component (a1) to the groups reactive toward isocyanates, i.e., the active hydrogen atoms, in components (a2) and (a3). If the index is 100, there is one active hydrogen atom, i.e. one function reactive toward isocyanates, in structural components (a2) and (a3) for each isocyanate group in structural component (a1). At indices above 100, there are more isocyanate groups than OH groups present.

The TPU can be produced by the known processes, continuously, for example by a reactive extruder, or by a belt process, using a one-shot process or a prepolymer process, or can be produced batchwise by the known prepolymer process.

In these processes, components (a1), (a2) and optionally (a3), (a4), and/or (a5) involved in the reaction can be mixed in succession or simultaneously with one another, whereupon the reaction immediately begins. In the extruder process, structural components (a1), and (a2), and also optionally (a3), (a4), and/or (a5) are introduced into the extruder individually or in the form of a mixture, and are reacted preferably at temperature of from 100 to 280° C., more preferably at from 140° C. to 250° C., and the resultant TPU is extruded, cooled and granulated.

A softer TPU degrade the abrasion resistance of final products (molded articles, e.g.) while a harder TPU degrade the impact resistance of final product. Thus, preference is given to the TPU having a hardness in the range from 70 shore A to 65 shore D, preferably in the range from 80 shore A to 65 shore D, more preferably in the range from 85 shore A to 54 shore D, especially in the range from 90 shore A to 98 shore A.

Polyolefin B)

A preferable polyolefin B) is a polymer derived from at least one monomer selected from a group consisting of ethylene, propylene, but-1-ene, isobutylene, 4-methyl-1-pentene, butadiene, isoprene, and mixtures thereof. Suitability is possessed by homopolymer or copolymer of the stated olefin monomer(s), and copolymers of at least one of the stated olefins as principal monomer, with other monomers (such as vinylaromatics, for example) as comonomers.

When polyolefin B) is made by using an aromatic monomer and a conjugated diene monomer such as a vinylaromatic monomer and butadiene, polyolefin B) contains the aromatic and conjugated diene monomer units (in total, weight %) at the amount less than that of the hydrogenated block copolymer C) as explained below. For example, polyolefin B) contains less than 10 weight % of the aromatic and conjugated diene monomers in total based on the weight of entire polyolefin B) while the hydrogenated block copolymer C) contains 70 weight % or more of the vinyl aromatic and conjugated diene monomer units in total, based on the of the weight entire block copolymer C).

The preferred polyolefin is polyethylene homopolymer, polyethylene copolymer, polypropylene homopolymer and/or polypropylene copolymer. The preferred polypropylene is, for example, biaxially oriented polypropylene (BOPP) and crystallized polypropylene. The preferred mixture of the aforementioned polyolefins are, for example, mixtures of polypropylene with polyisobutylene, polypropylene with polyethylene (e.g., PP/HDPE, PP/LDPE), and mixtures of different kinds of polyethylene (LDPE/HDPE, for example).

Among of those polyolefins, preference is given to a polyolefin B) essentially consisting of polyethylene, including both homopolymer and copolymer. More preferably, polyolefin B) comprises Low Density Polyethylene (PE-LD: LDPE).

A mixture of LDPE and Liner Low Density Polyethylene (PE-LLD:LLDPE) also can be used as a polyolefin B). However, great quantities of LLDPE result in lowering strength of a final product such as a molded article at lower temperature. Thus, preference is given to a polyolefin B)

comprising 40 weight % or less, preferably 20 weight % or less, more preferably 5 weight % or less of LLDPE. Most preferably, polyolefin B) has no LLDPE and essentially consists of LDPE. Preference is given to a polyolefin B) such as LDPE having MFR in the range from 0.5 to 13.0 g/10 min, more preferably less than 8 g/10 min, especially 1 to 4 g/10 min for polyolefin B). MFR (melt flow rate) is a value measured at the condition of 190° C. and 2.16 kg, defined by JIS K6922-1.

The term "LLDPE" means a polyethylene having 10 to 30 SCBs (short chain branches) per 1000 ethylene monomer units. "LDPE" generally means a polyethylene has a melting point in a range of 105 to 115° C. and a density in a range of 0.910 to 0.930.

Hydrogenated Block Copolymer C) (Compatibilizer)

The compatibilizer C) comprises one or more hydrogenated block copolymer(s) based on one or more vinyl aromatic monomer(s) and one or more conjugated diene monomer(s). Preference is given to the copolymer in which the total amount of the vinyl aromatic monomer units and conjugated diene monomer units is 70 weight % or more based on the mass of the entire block copolymer.

Examples of the vinyl aromatic monomer include vinyl aromatic compounds such as styrene, α-methylstyrene, p-methylstyrene, divinylbenzene, 1,1-diphenylethylene, N,N-dimethyl-p-aminoethyl styrene, N,N-diethyl-p-aminoethyl styrene, p-tert-butyl styrene, 1,3-dimethylstyrene, vinylnaphthalene and/or vinylanthracene. Such vinyl aromatic compounds may be used singly or in combination of two or more. In particular, styrene is preferred from the viewpoint of its cost and mechanical strength.

The conjugated diene refers to a di-olefin having a pair of conjugated double bonds. Examples of the conjugated diene include 1,3-butadiene, 2-methyl-1,3-butadiene (isoprene), 2,3-dimethyl-1,3-butadiene, 1,3-pentadiene, 2-methyl-1,3-pentadiene, 2,4-hexadiene, 1,3-hexadiene, 1,3-heptadiene, 2,4-heptadiene, 1,3-octadiene, 2,4-octadiene, 3,5-octadiene, 1,3-nonadiene, 2,4-nonadiene, 3,5-nonadiene, 1,3-decadiene, 2,4-decadiene, 3,5-decadiene, and/or 1,3-cyclohexadiene. Such dienes may be used singly or in combination of two or more. Particularly, 1,3-butadiene and isoprene are preferred from viewpoints of a balance between their workability and mechanical strength.

Preference is given to the hydrogenated block copolymer having both styrene monomer units and butadiene monomer units which are derived from styrene monomers and butadiene monomer respectively. More preferably, the hydrogenated block copolymer is a partially or perfectly hydrogenated where one or more butadiene monomer unit is hydrogenated. "Partially hydrogenated copolymer" is a copolymer having at least 5% and less than 97% of hydrogenation rate while "perfectly hydrogenated copolymer" is a copolymer having 97% to 100% of hydrogenation rate.

The hydrogenated block copolymer containing too much double bonds tends to deteriorate the TPU A). Thus, preference is given to a hydrogenated block copolymer having less double bonds, i.e., highly hydrogenated or perfectly hydrogenated copolymer where hydrogenation rate is 80% or more, preferably 90% or more, more preferably 95% or more, especially 97% or more (perfectly hydrogenated).

Here, the hydrogenation rate is a hydrogenation rate of unsaturated double bonds, derived from the conjugated diene monomer, in the hydrogenated block copolymer. In other words, the hydrogenation rate means a ratio of hydrogenated double bonds of the conjugated dienes to both hydrogenated and unhydrogenated double bonds (i.e., double bonds before hydrogenation) of the conjugated dienes. The hydrogenation rate can be determined by comparing NMR spectra of the block copolymer, before and after hydrogenation, by using a nuclear magnetic resonance (NMR) apparatus.

The most preferable hydrogenated block copolymer is styrene-butadiene-butylene-styrene copolymer (SBBS) (partially hydrogenated) or styrene-ethylene-butylene-styrene copolymer (SEBS), especially SEBS. In this description, the term "SEBS" means SBBS which is perfectly hydrogenated (97% or more of hydrogenation ratio). Preferably, the mass ratio of styrene/ethylene (and/or ethylene) is 20/80 to 40/60.

The hydrogenated block copolymer may further contain one or more functional groups. The position of the functional group in the hydrogenated block copolymer is not particularly limited but may be in the molecular chain or at molecular end(s), or it may be grafted. However, too much functional groups rather deteriorate the TPU A) and thus the preference is given to the copolymer C) having functional groups(s) at one or more molecular ends only.

Examples of functional groups include a hydroxy group, a carboxyl group, a carbonyl group, a thiocarbonyl group, an acid halide group, an acid anhydride group, a thiocarboxylic acid group, an aldehyde group, a thioaldehyde group, a carboxylate group, an amide group, a sulfonic group, a sulfonate group, a phosphate group, a phosphoester group, an amino group, an imino group, a nitrile group, a pyridyl group, a quinoline group, an epoxy group, a thioepoxy group, a sulfide group, an isocyanate group, an isothiocyanate group, a halogenated silicon group, an alkoxy silicon group, a halogenated tin group, a boronic acid group, a boron-containing group, a boronate group, an alkoxytin group and/or a phenyltin group.

Among of those functional groups, acidic groups tend to deteriorate the TPU A) worse than others and thus preference is given to basic groups such as amino groups. Preference is also given to a hydrogenated block copolymer C) comprising 50 wt. % or more of an amine modified (having amino group) hydrogenated block copolymer and/or an unmodified hydrogenated block copolymer, more preferably a hydrogenated block copolymer C) essentially consisting of the amine modified hydrogenated block copolymer and/or unmodified hydrogenated block copolymer.

Particularly preferred is a hydrogenated block polymer having at least one group selected from primary to tertiary amino groups since amino groups improve the compatibility so that the composition, semi-processed product and/or final product have a sea structure. Especially, a secondary amino group bonded to the molecular end of the copolymer C) is preferably contained as the functional group.

Additives

The inventive polymer composition may comprise varietal additive(s), in addition to components A) to C). Such additives are not particularly limited but may be additives known to public such as a filler, a colorants, a flame retardant, a plasticizer and/or an aging inhibitor. Such additives may be used singly or in combination of two or more in the inventive composition.

Preparation

Components A) to C) and optionally one or more additives are mixed by a mixer such as a single-screw extruder, a twin-screw extruder, a kneader and/or a Banbury mixer, in the presence of solvent or in absence of solvent, and thus the inventive polymer composition is obtained. Preference is given to the extruder which can be operated continuously, especially the twin-screw extruder which can apply a great shearing force. If necessary, those components may be mixed while being heated at 100 to 250° C., preferably at 180 to 230° C., more preferably at 190 to 220° C. Too high temperature makes the TPU A) decomposed while too low temperature deteriorates the dispersibility of polyolefine B) in the TPU A).

Morphology

The inventive polymer composition may be a solid at room temperature and stored as a semi-processed product. The shape of such semi-processed product is not particularly limited but is may be pellet-shaped (polymer composite pellets). Such composite pellets are made by pelletizing the inventive composition polymer by several manners as usual. In the solid polymer composition, polyolefin B) is dispersed in the TPU A). That is, the solid polymer composition has sea-island structure where the TPU A) forms sea and the polyolefin B) forms islands. Islands (phases) of polyolefin B) are not particularly limited but may be appeared as particle-shapes having diameter of 100 nm to 1000 µm in a cut surface (cross section) of the pellet. Here, the particle shape means that a cross section of the island is circular, oval or rectangular shape with/without rugged pattern(s) on the outer peripheral thereof.

In this case, compatibilizer C) forms islands having the average diameter smaller than polyolefin and islands of compatibilizer are present on a surface of polyolefin-islands and/or are independently dispersed in the TPU-sea.

The diameter of those polyolefin islands is a value measured by using an AFM (atomic force microscope). When particles (islands) are not spherical, the diameter is obtained from the maximum diameter and minimum diameter by using the following formula (I):

$$d=(L_1+L_2)/2 \quad (I)$$

wherein d is a diameter of the particle, $L_1$ is a maximum diameter (major axis) and $L_2$ is a minimum diameter (minor axis).

In the inventive polymer composition, preference is given to the polyolefin islands having the average diameter of 0.1 µm to 50 µm, more preferably 0.1 µm to 3 µm. In the invention, the average diameter means an arithmetic mean of diameters of 30 islands. That is, 30 islands are picked up from an AFM image, diameters of 30 islands are respectively measured or obtained by using formula (I), and then the arithmetic mean is calculated.

Mechanical Properties

The inventive polymer composition preferably has a density of 1.03 to 1.06. To obtain enough toughness, the final product (molded article) may have an abrasion loss (abrasion quantity) 30 to 70 mm³ under the abrasion test, according to DIN 53516. Moreover, preference is given to the final product maintaining flexibility at −10° C. or below so as to employ such final product in various uses.

Final Product

The polymer composition of the invention can be used for producing varietal final products, for example, by molding, extrusion molding, injection molding, press molding and/or blow molding. When molding the polymer composition or semi-processed product, the polymer composition or semi-processed product is preferably heated at 100 to 250° C., more preferably at 180 to 230° C., especially at 190 to 220° C. Too high temperature makes the TPU A) decomposed while too low temperature deteriorate the dispersibility of the polyolefine B) in the TPU A).

Even after preparing the final product by heating and/or molding, the sea island structure is maintained by using the polymer composition of the invention. In other words, islands (phases) of the polyolefin B) are dispersed in the TPU A) even in the final product. Islands of polyolefin B) become to have diameters within a range of 100 nm to 1000 µm, and the average diameter of 0.1 µm to 50 µm, more preferably 0.1 µm to 3 µm. In the final product, compatibilizer C) also forms islands having the average diameter smaller than polyolefin and islands of compatibilizer are present on a surface of polyolefin-islands and/or are independently dispersed in the TPU-sea.

Final products made from the polymer composition of the invention are not limited. For example, the final products are moldings, and preferred moldings are shoe soles, rollers, cladding in automobiles, hoses, coatings, cables, profiles, laminates, floors for buildings and transport, plug connectors, cable plugs, folding bellows, drag cables, solar modules, wiper blades, cable sheathing, gaskets, drive belts, nonwoven textiles, damping elements, foils or fibers. Preference is given to shoe soles, especially to shoe outsoles.

EXAMPLES

Example 1

70 parts by weight of TPU (A) (BASF co., Ltd., "Elastollan 1198A50"), 30 parts by weight of polyethylene resin (B) (Tosou co., Ltd., "Petrothene 170", MFR: 1.0 g/min.), and 10 parts by weight of amine modified-SBBS (Asahi kasei co., Ltd., "Tuftec MP10") were dry-blended (blended without solvent), charged into a twin extruder (Ikegaki Koki co., Ltd., screw diameter 30 mm) and then processed at 220° C. of the cylinder temperature and 150 rpm of the screw rotation. The composition resulting from the above process was then crushed by using a pelletizer and thus pellet shaped polymer composite composition is obtained.

The TPU used for this example (Elastollan 1198A50) is a polyurethane produced from 4,4'-diphenylmethane diisocyanate as an isocyanate, polytetramethylene ether glycol (Mw=1000) as a polyether polyol, 1,4-butanediol as a chain extender and Inganox 1010 and Irganox 1098 (BASF SE) as additives.

After aging at 80° C. for 5 hours, pellets of the polymer composite composition were charged into a hopper injection molding machine, processed at 220° C. of cylinder setting temperature and 25° C. of the mold temperature and thus a mold injected board was obtained.

The board was cut into test pieces having a size of 160 mm*100 mm*2 mm. For the izod test as mentioned blow, a notch (hollow) was made in the test piece by using a specific tool.

Examples 2 to 5

Test pieces were produced by the same method as example 1, except that amounts of components A to C were changed as shown in Table 1.

Example 6

Test pieces were produced by the same method as example 1, except that SEBS (Asahi kasei co., Ltd., "Tuftec H1041") was used as compatibilizer C). Here, SEBS is a SBBS which is perfectly hydrogenated and having no functional group such as amine (unmodified).

Example 7

Test pieces were produced by the same method as example 1, except that SBBS (Asahi kasei co., Ltd., "Tuftec P1083") was used as compatibilizer C). This SBBS is a block copolymer having no functional group such as amines (unmodified).

Example 8

Test pieces were produced by the same method as example 1, except that a TPU having a shore hardness 80A (BASF Japan Ltd., "Elastollan 1180A50") was used as the TPU A).

Example 9

Test pieces were produced by the same method as example 1, except that a TPU having a shore hardness 64D (BASF Japan Ltd., "Elastollan 1164D50") was used as the TPU A).

Example 10

Test pieces were produced by the same method as example 1, except that a TPU having a shore hardness 70A (BASF Japan Ltd., "Elastollan ET870-11V") was used as the TPU A).

Example 11

Test pieces were produced by the same method as example 1, except that a TPU having a shore hardness 74D (BASF Japan Ltd., "Elastollan 1174D50") was used as the TPU A).

Example 12

The test pieces were produced by the same method as example 1, except that a maleic modified SEBS (Asahi kasei co., Ltd., "Tuftec M1913") was used as the compatibilizer C).

Example 13

Test pieces were produced by the same method as example 1, except that SEBS having a glycidyl methacrylate (GMA) as a functional group was used as the compatibilizer C).

Example 14

Test pieces were produced by the same method as example 1, except that LDPE having a MFR of 8.0 g/min was used as the polyolefin B).

Example 15

Test pieces were produced by the same method as example 1, except that LDPE having a MFR of 13.0 g/min was used as the polyolefin B).

Example 16

Test pieces were produced by the same method as example 1, except that LLDPE having a MFR of 1.1 g/min was used as the polyolefin B).

Example 17

Test pieces were produced by the same method as example 1, except that LLDPE having a MFR of 3.0 g/min was used as the polyolefin B).

Example 18

Test pieces were produced by the same method as example 1, except that LLDPE having a MFR of 8.0 g/min was used as the polyolefin B).

Example 19

Test pieces were produced by the same method as example 1, except that polypropylene was used as the polyolefin B) and TPU having a shore hardness of 56D was used as the TPU A).

Comparative Example 1

The test pieces were produced by the same method as example 1, except that a maleic anhydride-modified LLDPE was used as compatibilizer C).

Comparative Example 2

The test pieces were produced by the same method as example 1, except that maleic anhydride-modified mPE (metallocene catalyzed polyethylene) was used as compatibilizer C).

Comparative Examples 3 to 5

Test pieces were produced by the same method as example 1, except that amounts of components A to C were changed as shown in Table 4.

Evaluation

Following evaluation test were done by using test pieces of examples 1 to 19 and comparative examples 1 to 5.

Hardness

Values of hardness (shore hardness) were measured according to DIN 53505 and results were shown in Tables 1 to 4.

100% Mo (100% Module)

Values of 100% Mo were measured according to DIN53504-S2 and results were shown in Tables 1 to 4.

Tensile Strength

Tensile strengths are measured according to DIN 53504 and results were shown in Tables 1 to 4.

Izot impact test (at −10° C.)

Izot impact test was done for test pieces having notches at −10° C. according to DIN 53504. Results were shown in Tables 1 to 4. In Tables, NB means that no breakage was found after the izot impact test (no breakage).

Repeat bending test (at −10° C., 100,000 times)

Each test piece was bended at −10° C. repeatedly (maximum: 100, 000 times). The bending angle was 90 degrees. It was judged as N.B. when no breakage was found even after reaching 100,000 times. Results were shown in Tables 1 to 4 with number (times) when breakage(s) was occurred.

DIN 53516 Abrasion Loss

Abrasion loss was measured according to DIN 53516 and results were shown in Tables 1 to 4.

Intercalation Measurement

Test pieces having 2 mm thickness were produced by using injection molding molds. After molded test pieces were removed from molds, it was measured whether the molds had polyethylene remaining layer or not. The polyethylene remaining layer means that the product does not meet the customers' requirement because of its poor appearance. Results were shown in Tables 1 to 4, OK as no remaining while NG as remaining.

TABLE 1

|   |   |   | Example | 1 | 2 | 3 | 4 | 5 | 6 |
|---|---|---|---|---|---|---|---|---|---|
| A | TPU | (Phr) | | 70 | 70 | 70 | 80 | 60 | 70 |
|   | TPU hardness | (A/D) | | 98A | 98A | 98A | 98A | 98A | 98A |
| B | LDPE | (Phr) | | 30 | 30 | 30 | 20 | 40 | 30 |
| C | Compatibilizer | (Phr) | | 10 | 15 | 5 | 5 | 5 | 10 |
|   |   | (—) | | amine modified SBBS | amine modified SBBS | amine modified SBBS | amine modified SBBS | amine modified SBBS | SEBS |
| Mechanical Properties | Hardness | (A/D) | | 97A | 95A | 97A | 98A | 95A | 97A |
|   | 100% Mo | (MPa) | | 8 | 7 | 10 | 14 | 7 | 12 |
|   | Tensile strength | (MPa) | | 33 | 30 | 35 | 40 | 28 | 36 |
|   | Density | (—) | | 1.06 | 1.05 | 1.07 | 1.09 | 1.04 | 1.06 |
|   | Bending test | (times) | | N.B. | N.B. | N.B. | N.B. | N.B. | N.B. |
|   | DIN abrasion loss | (mm$^3$) | | 35 | 50 | 45 | 40 | 50 | 40 |
|   | Izot (at −10° C.) | (kJ/m$^2$) | | N.B. | N.B. | N.B. | N.B. | N.B. | N.B. |
|   | Intercalation | (—) | | OK | OK | OK | OK | OK | OK |

TABLE 2

|   |   |   | Example | 7 | 8 | 9 | 10 | 11 | 12 |
|---|---|---|---|---|---|---|---|---|---|
| A | TPU | (Phr) | | 70 | 70 | 70 | 70 | 70 | 70 |
|   | TPU hardness | (A/D) | | 98A | 80A | 64D | 70A | 74D | 98A |
| B | LDPE | (Phr) | | 30 | 30 | 30 | 30 | 30 | 30 |
| C | Compatibilizer | (Phr) | | 10 | 10 | 10 | 10 | 10 | 10 |
|   |   | (—) | | SBBS | amine modified SBBS | amine modified SBBS | amine modified SBBS | amine modified SBBS | maleic modified SEBS |
| Mechanical Properties | Hardness | (A/D) | | 97A | 92A | 57D | 85A | 60D | 97A |
|   | 100% Mo | (MPa) | | 10 | 6 | 15 | 7 | 18 | 10 |
|   | Tensile strength | (MPa) | | 36 | 30 | 40 | 17 | — | 30 |
|   | Density | (—) | | 1.06 | 1.03 | 1.07 | 1.01 | 1.09 | 1.06 |
|   | Bending test | (times) | | N.B. | N.B. | N.B. | N.B. | 30,000 | 60,000 |
|   | DIN abrasion loss | (mm$^3$) | | 50 | 80 | 45 | 120 | 40 | 70 |
|   | Izot (at −10° C.) | (kJ/m$^2$) | | N.B. | N.B. | N.B. | N.B. | Break | N.B. |
|   | Intercalation | (—) | | OK | OK | OK | OK | OK | NG |

TABLE 3

|   |   |   | Example | 13 | 14 | 15 | 16 | 17 | 18 | 19 |
|---|---|---|---|---|---|---|---|---|---|---|
| A | TPU | Phr | | 70 | 70 | 70 | 70 | 70 | 70 | 70 |
|   | TPU hardness | A/D | | 98A | 98A | 98A | 98A | 98A | 98A | 56D |
| B | Polyolefin | Phr | | 30 | 30 | 30 | 30 | 30 | 30 | 30 |
|   |   | Type | | LDPE Petrothene170 | LDPE Petrothene342 | LDPE Petrothene349 | LLDPE Nipolon-LF21 | LLDPE Nipolon-LM50 | LLDPE Nipolon-LM60 | PP Novatec BC8 |
|   | MFR | g/min | | 1.0 | 8.0 | 13.0 | 1.1 | 3.0 | 8.0 | 1.8 |
| C | Compatibilizer | Phr | | 10 | 10 | 10 | 10 | 10 | 10 | 10 |
|   |   | Type | | GMA-SEBS | amine modified SBBS | amine modified SBBS | amine modified SBBS | amine modified SBBS | amine modified SBBS | amine modified SBBS |
| Mechanical Properties | Hardness | A/D | | 96A | 95A | 94A | 94A | 94A | 94A | 57D |
|   | 100% Mo | MPa | | 10 | 7 | 7 | 5 | 5 | 5 | 16 |
|   | Tensile strength | MPa | | 30 | 30 | 33 | 30 | 30 | 25 | 45 |
|   | Density | | | 1.06 | 1.06 | 1.06 | 1.07 | 1.07 | 1.07 | 1.05 |
|   | Bending test | times | | — | N.B. | N.B. | — | — | — | — |
|   | DIN abrasion loss | mm$^3$ | | 120 | 45 | 80 | 100 | 110 | 75 | 80 |
|   | Izot (at −10° C.) | kJ/m$^2$ | | — | N.B. | N.B. | Break | Break | Break | Break |
|   | Intercalation | | | NG | OK | OK | OK | OK | OK | OK |

TABLE 4

|  |  |  | Comparative Example 1 | 2 | 3 | 4 | 5 |
|---|---|---|---|---|---|---|---|
| A | TPU | (Phr) | 70 | 70 | 50 | 70 | 90 |
|  | TPU hardness | (A/D) | 98A | 98A | 98A | 98A | 98A |
| B | LDPE | (Phr) | 30 | 30 | 50 | 30 | 10 |
| C | Compatibilizer | (Phr) | 10 | 10 | 10 | 0 | 10 |
|  |  | (—) | maleic anhydride-modified LLDPE | maleic anhydride-modified LLDPE | amine modified SBBS | non | amine modified SBBS |
| Mechanical Properties | Hardness | (A/D) | 96A | 95A | 95A | 98A | 98A |
|  | 100% Mo | (MPa) | — | — | 5 | — | 12 |
|  | Tensile strength | (MPa) | — | — | 20 | — | 43 |
|  | Density | (—) | 1.06 | 1.06 | 1.02 | 1.06 | 1.11 |
|  | Bending test | (times) | N.B. | N.B. | 10,000 | 18,000 | N.B. |
|  | DIN abrasion loss | (mm$^3$) | 90 | 100 | 120 | 110 | 45 |
|  | Izot (at −10° C.) | (kJ/m$^2$) | — | — | Break | Break | N.B. |
|  | Intercalation | (—) | NG | NG | OK | NG | OK |

Morphology Observation

Figure 1:
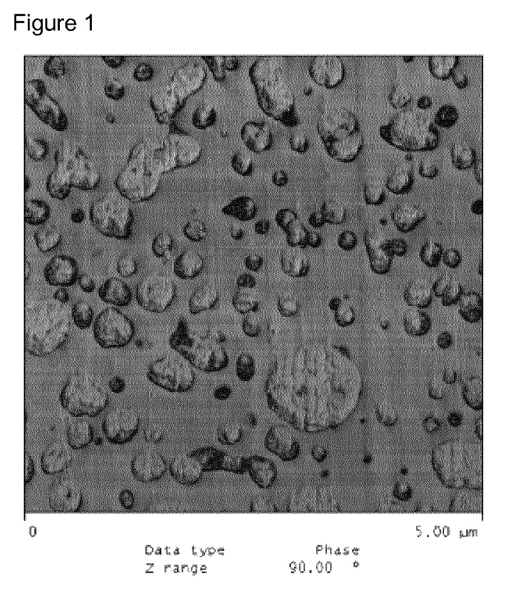
FIG. 1 shows an AFM image of the cut surface (Example 1, processed at 220° C.).

The cryo-ultramicrotomed block faces of the test piece (Example 1) were imaged for 5 μm*5 μm area by using AFM in Tapping Mode (trademark of Veeco). FIG. 1 shows the AFM image of Example 1. As shown in FIG. 1, it was observed that LDPE (islands)/TPU (sea) structure was made in the composition and smaller islands of compatibilizer were present on surfaces of LDPE islands.

Figure 2:
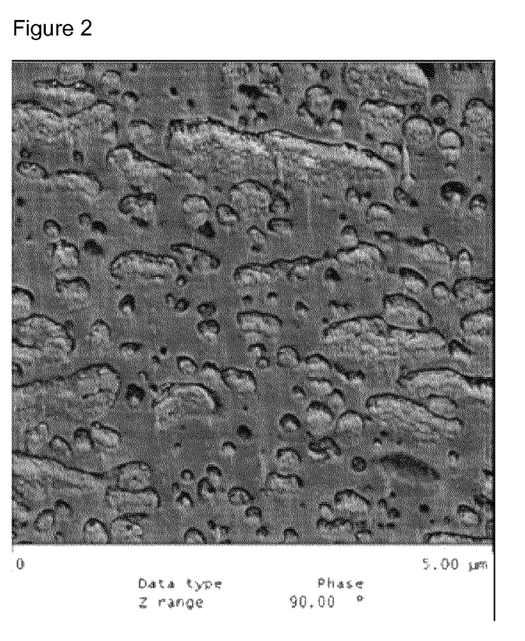
FIG. 2 shows an AFM image of the cut surface (Example 1, processed at 205° C.)

FIG. 2 shows an AFM image of a test piece prepared by the same method as example 1, except that the processing temperature in the twin extruder and molding is respectively changed from 220° C. to 205° C. As shown in FIG. 2, it is confirmed that the polymer composition of the invention forms the sea-island structure even when the processing temperature is changed.

The invention claimed is:

1. A polymer composition comprising:
   A) 60 to 85 parts by weight of a thermoplastic polyurethane;
   B) 15 to 40 parts by weight of a polyolefin, where parts by weight of the thermoplastic polyurethane A) and parts by weight of the polyolefin B) add up to 100 parts by weight; and
   C) 1 to 15 parts by weight of a hydrogenated block copolymer derived from a vinyl aromatic monomer and a conjugated diene monomer, based on 100 parts by weight as a total amount of the thermoplastic polyurethane A) and polyolefin B),
   wherein the polyolefin B) is a polyethylene, and the hydrogenated block copolymer C) is an amine-modified hydrogenated block copolymer, and
   wherein the hydrogenated block copolymer C) comprises functional group(s) at one or more molecular ends only.

2. The polymer composition according to claim 1 comprising:
   A) 65 to 75 parts by weight of the thermoplastic polyurethane;
   B) 20 to 35 parts by weight of the polyolefin, where parts by weight of the thermoplastic polyurethane A) and parts by weight of the polyolefin B) add up to 100 parts by weight; and
   C) 5 to 10 parts by weight of the hydrogenated block copolymer, based on 100 parts by weight as the total amount of the thermoplastic polyurethane A) and polyolefin B).

3. The polymer composition according to claim 1, wherein the hydrogenated block copolymer C) has 97% or more of a hydrogenation rate of double bonds derived from the conjugated diene monomer.

4. The polymer composition according to claim 1, wherein the hydrogenated block copolymer C) comprises an amino group as a functional group.

5. The polymer composition according to claim 1, wherein the thermoplastic polyurethane A) is derived from a diisocyanate and a polyether polyol.

6. The polymer composition according to claim 5, wherein the polyether polyol comprises a polytetrahydrofuran.

7. The polymer composition according to claim 1, wherein the thermoplastic polyurethane A) has a hardness measured in accordance with DIN 53505 of 70 shore A to 65 shore D.

8. The polymer composition according to claim 1, wherein the polyolefin B) is a low density polyethylene.

9. The polymer composition according to claim 1, wherein the polyolefin B) has an MFR of 13 g/10 min. or less, wherein the MFR is a value measured at 190° C. under a load of 2.16 kg according to test method MN K6922-1.

10. An injection or extrusion molded article comprising the polymer composition of claim 1.

11. The molded article according to claim 10, wherein phases of the polyolefin B) are dispersed in the thermoplastic polyurethane A) in the molded article.

12. The molded article according to claim 10, wherein the molded article is a shoe out sole.

13. The polymer composition according to claim 1, wherein a test piece formed from the composition does not break after being bent 100; 000 times to 90 degrees at −10° C.

14. The polymer composition according to claim 1, comprising:
   A) 60 to 80 parts by weight of the thermoplastic polyurethane;
   B) 20 to 40 parts by weight of the polyolefin, where parts by weight of the thermoplastic polyurethane A) and parts by weight of the polyolefin B) add up to 100 parts by weight; and
   C) 5 to 10 parts by weight of the hydrogenated block copolymer based on 100 parts by weight as a total amount of the thermoplastic polyurethane A) and polyolefin B).

15. The polymer composition according to claim 1, wherein the hydrogenated block copolymer C) is a styrene-butadiene-butylene-styrene copolymer (SBBS) or a styrene-ethylene-butylene-styrene copolymer (SEBS).

16. The polymer composition according to claim 1, wherein the hydrogenated block copolymer C) comprises butylene monomer units derived from butylene monomers.

17. The polymer composition of claim 1, which does not comprise a hydrogenated block copolymer comprising functional group(s) in the molecular chain.

18. The polymer composition of claim 1, which does not comprise a hydrogenated block copolymer not comprising functional group(s) at one or more molecular ends only.

19. The polymer composition of claim 1, wherein the hydrogenated block copolymer C) comprises butadiene monomer units derived from butadiene monomers as the conjugated diene monomers, and styrene monomer units derived from styrene monomers as the vinyl aromatic monomers, and wherein at least one of the butadiene monomer units is hydrogenated.

* * * * *

UNITED STATES PATENT AND TRADEMARK OFFICE
CERTIFICATE OF CORRECTION

PATENT NO. : 10,633,479 B2
APPLICATION NO. : 15/565434
DATED : April 28, 2020
INVENTOR(S) : Koji Sakamoto Page 1 of 1

It is certified that error appears in the above-identified patent and that said Letters Patent is hereby corrected as shown below:

In the Claims

Column 14, Line 44, Claim 9, "MN" should read -- JIN --.

Column 14, Line 54, Claim 13, "100; 000" should read -- 100,000 --.

Signed and Sealed this
Eighth Day of September, 2020

Andrei Iancu
*Director of the United States Patent and Trademark Office*